US012551099B2

(12) United States Patent
Tatara et al.

(10) Patent No.: US 12,551,099 B2
(45) Date of Patent: Feb. 17, 2026

(54) OPHTHALMOLOGIC APPARATUS

(71) Applicant: TOPCON CORPORATION, Tokyo (JP)

(72) Inventors: Yoko Tatara, Tokyo (JP); Makoto Saika, Tokyo (JP); Takafumi Yukimori, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 370 days.

(21) Appl. No.: 18/127,280

(22) Filed: Mar. 28, 2023

(65) Prior Publication Data
US 2023/0309819 A1 Oct. 5, 2023

(30) Foreign Application Priority Data

Mar. 31, 2022 (JP) ................................ 2022-060039

(51) Int. Cl.
A61B 3/032 (2006.01)
A61B 3/00 (2006.01)
A61B 3/18 (2006.01)

(52) U.S. Cl.
CPC ............ *A61B 3/032* (2013.01); *A61B 3/0075* (2013.01); *A61B 3/18* (2013.01)

(58) Field of Classification Search
CPC ......... A61B 3/032; A61B 3/0075; A61B 3/18; A61B 3/028; A61B 3/08; A61B 3/103;
(Continued)

(56) References Cited

U.S. PATENT DOCUMENTS 11,385,710 B2 * 7/2022 Li .............................. G06T 7/60
12,277,268 B2 * 4/2025 Thieberger ........... H04N 23/651
(Continued)

FOREIGN PATENT DOCUMENTS

JP H0217224 A 1/1990
JP 2006305325 A 11/2006
(Continued)

OTHER PUBLICATIONS

European Search Report from corresponding European Application No. 23164914, mailed on Aug. 1, 2023, 8 pages.
(Continued)

Primary Examiner — Dmitriy Bolotin
(74) Attorney, Agent, or Firm — Tucker Ellis LLP

(57) ABSTRACT

An ophthalmologic apparatus includes an optotype presentation mechanism that presents an optotype to a left subject eye and a right subject eye, and is capable of changing a brightness difference between the optotype presented to the left subject eye and the optotype presented to the right subject eye, a convergence adjustment mechanism configured to adjust a convergence distance, an eye information obtaining portion configured to obtain eye information on the left subject eye and the right subject eye, and a controller configured to control the optotype presentation mechanism, the convergence adjustment mechanism, and the eye information obtaining portion, wherein the controller sets the convergence distance to a distance different from a optotype presentation distance, gradually increases a brightness difference, and detects a visual line direction of the left subject eye and a visual line direction of the right subject eye based on the eye information.

8 Claims, 5 Drawing Sheets

(58) Field of Classification Search
CPC ........... A61B 3/113; A61B 3/145; A61B 3/10; A61B 3/0016; A61B 3/0025; A61B 3/0041; A61B 3/0083; A61B 3/022; A61B 3/024; A61B 3/0285; A61B 3/102; A61B 3/107; A61B 3/12; A61B 3/14; A61B 3/165

See application file for complete search history.

(56) References Cited

U.S. PATENT DOCUMENTS

| | | | | |
|---|---|---|---|---|
| 2005/0280776 | A1* | 12/2005 | Suzuki | A61B 3/032 351/224 |
| 2006/0001831 | A1* | 1/2006 | Sumiya | A61B 3/024 351/224 |
| 2013/0044291 | A1 | 2/2013 | Kato et al. | |
| 2019/0099076 | A1 | 4/2019 | Fujikado | |
| 2022/0151486 | A1* | 5/2022 | Tatara | A61B 3/152 |

FOREIGN PATENT DOCUMENTS

| | | |
|---|---|---|
| JP | 2010259495 A | 11/2010 |
| JP | 2020093113 A | 6/2020 |
| JP | 2021037042 A | 3/2021 |
| JP | 2021142207 A | 9/2021 |
| WO | 2016195067 A1 | 12/2016 |

OTHER PUBLICATIONS

Japanese Office Action from corresponding Application No. 2022-060039 mailed on Jun. 24, 2025, 6 pages with translation.

* cited by examiner

OPHTHALMOLOGIC APPARATUS

CROSS-REFERENCE TO RELATED APPLICATION

The present application is based on and claims priority to Japanese Patent Application No. 2022-060039 filed on Mar. 31, 2022, the disclosure of which is hereby incorporated by reference in its entirety.

FIELD OF THE INVENTION

The present disclosure relates to an ophthalmologic apparatus.

BACKGROUND

There is a conventionally known ophthalmologic apparatus that estimates an eyestrain level of a subject eye based on a timing in which ocular deviation (deviation of visual line) occurs (e.g., see JP2017-169601A). Such ocular deviation occurs when a visual field of one subject eye is gradually darkened from a condition in which an optotype is visually recognized by both eyes, so that a fusion is destroyed, and the visual line of one subject eye is deviated. In the conventional ophthalmologic apparatus, it is assumed that the ocular deviation occurs when a fusion is destroyed by darkening a visual field of one subject eye. However, when an examinee has no exophoria and/or esophoria, the visual line is not deviated even though the fusion is destroyed from a binocular vision condition, so that the ocular deviation does not occur. For this reason, the ocular deviation cannot be detected, so that the eyestrain cannot be estimated.

The present disclosure has been made in view of the above problem. An object of the present disclosure is to provide an ophthalmologic apparatus capable of detecting ocular deviation when a brightness difference of an optotype presented to left and right subject eyes is increased from a binocular vison condition regardless of presence of heterophoria.

SUMMARY

To achieve the object, an ophthalmologic apparatus includes an optotype presentation mechanism, when a distance from a left subject eye and a right subject eye to an optotype is an optotype presentation distance, a position where a visual line of the left subject eye and a visual line of the right subject eye cross is a visual line crossing, and a distance from the left subject eye and the right subject eye to the visual line crossing is a convergence distance, configured to present the optotype to the left subject eye and the right subject eye, and be capable of changing a brightness difference between the optotype presented to the left subject eye and the optotype presented to the right subject eye, a convergence adjustment mechanism configured to adjust the convergence distance, an eye information obtaining portion configured to obtain eye information on the left subject eye and the right subject eye, and a controller configured to control the optotype presentation mechanism, the convergence adjustment mechanism, and the eye information obtaining portion, wherein the controller sets the convergence distance to a distance different from the optotype presentation distance by controlling the convergence adjustment mechanism, gradually increases the brightness difference while presenting the optotype at an voluntary optotype presentation distance by the optotype presentation mechanism, and detects a visual line direction of the left subject eye and a visual line direction of the right subject eye based on the eye information obtained by the eye information obtaining portion.

DETAILED DESCRIPTION

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

An ophthalmologic apparatus according to a first embodiment of the present disclosure will be described below with reference to the accompanying drawings.

The ophthalmologic apparatus 1 according to the first embodiment is an ophthalmologic apparatus including an optical system that measures eye characteristics of a subject eye and enabling objective and subjective measurement of the eye characteristics of the subject eye. That is, an examiner can carry out the objective examination and the subjective examination with the ophthalmologic apparatus 1. In the objective examination, a subject eye is irradiated with light and then information regarding the subject eye (eye characteristics thereof) is measured based on the detection result of the reflected light. The objective examination includes the measurement for the acquisition of the eye characteristics of the subject eye and photographing or capturing for the acquisition of an image of the subject eye. For example, the objective examination includes refractive power measurement (refraction measurement), cornea shape measurement (kerato-measurement), eye pressure measurement, fundus photography or fundus shooting, photographing with optical coherence tomography (OCT photographing), measurement with OCT, and the like. In the subjective examination, the examinee is presented with the optotype, the eyechart, or the like, and then, the information regarding the subject eye E (eye characteristics) is measured based on the examinee's response to the presented optotype, the eyechart, or the like. For example, the subjective examination includes the subjective refraction measurements such as a far-point examination, a mid-point examination, a near-point examination, a contrast test, a glare test, a visual field test, and the like.

The ophthalmologic apparatus 1 according to the first embodiment is a binocular open-field type apparatus enabling simultaneous measurement of eye characteristics (ocular characteristics) of both eyes of an examinee with the left and right eyes open. The ophthalmologic apparatus 1 may measure the eye characteristics of each of the eyes by occluding the eye or turning off a fixation target.

Figure 1:
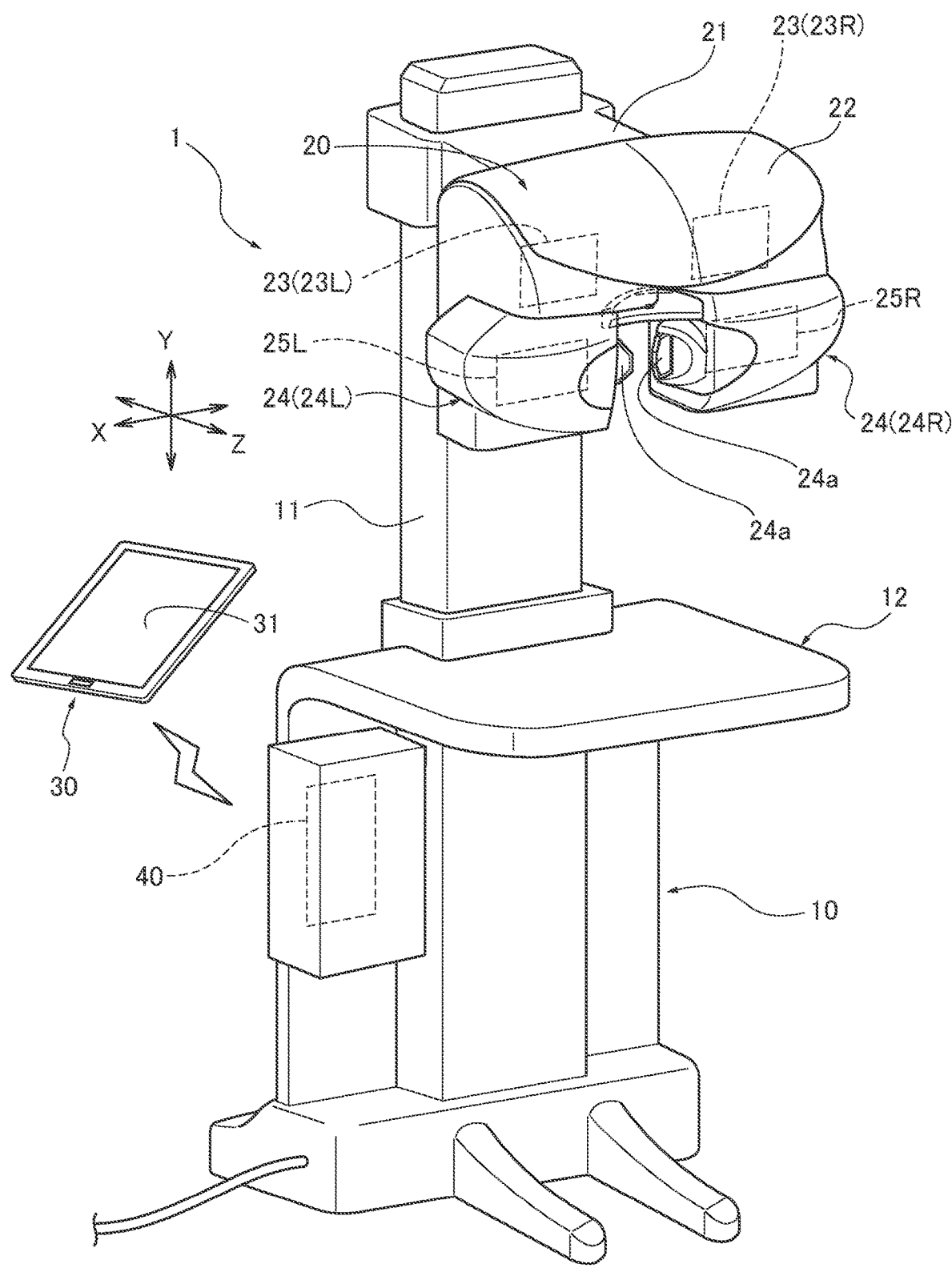
FIG. 1 is a perspective view of the external appearance of an ophthalmologic apparatus according to a first embodiment.

As illustrated in FIG. 1, the ophthalmologic apparatus 1 includes a support base 10, a measurement portion 20, an examiner controller 30, a controller 40, and a not-shown examinee controller. FIG. 1 shows X, Y, and Z directions. Hereinafter, a left-right direction is defined as the X direction, an up-down direction (vertical direction) is defined as the Y direction, and a direction (depth direction) orthogonal to the X and Y directions is defined as the Z direction. The directions are defined as seen from the examinee.

The support base 10 includes a pillar 11 placed on the floor and an eye examination table 12 supported by the pillar 11. The eye examination table 12 is used to place devices such as the examiner controller 30 or tools used during the eye examination and support the posture of the examinee. The position in the Y direction (height) of the eye examination table 12 may be fixed or may be supported by the pillar 11 to be adjustable in the Y direction.

The measurement portion 20 includes an arm 21 and a measurement head 22. The arm 21 extends in the Z direction from the pillar 11 to a first side, which is an examinee side. The arm 21 has an end supported at the leading end of the pillar 11 and the other end to which the measurement head 22 is attached. Thus, the measurement head 22 is suspended from the pillar 11 via the arm 21 above the eye examination table 12. The arm 21 is movable in the Y direction with respect to the pillar 11. The arm 21 may be movable in the X direction and/or the Z direction with respect to the pillar 11.

The measurement head 22 is configured to separately measure the eye characteristics of a subject eye E of the examinee on the left side (left subject eye EL) and a subject eye E of the examinee on the right side (right subject eye ER). The measurement head 22 includes a left eye driver 23L and a right eye driver 23R attached to the leading end of the arm 21, a left measurement portion 24L provided below the left eye driver 23L and a right measurement portion 24R provided below the right eye driver 23R.

The left measurement portion 24L and the right measurement portion 24R are paired to correspond to the left and right eyes of the examinee, respectively. The left measurement portion 24L includes a left measurement optical system 25L that is configured to measure the eye characteristics of the left subject eye EL. The right measurement portion 24R includes a right measurement optical system 25R that is configured to measure the eye characteristics of the right subject eye ER. Measurement results from the left measurement portion 24L and the right measurement portion 24R are input to the controller 40.

Figure 2:
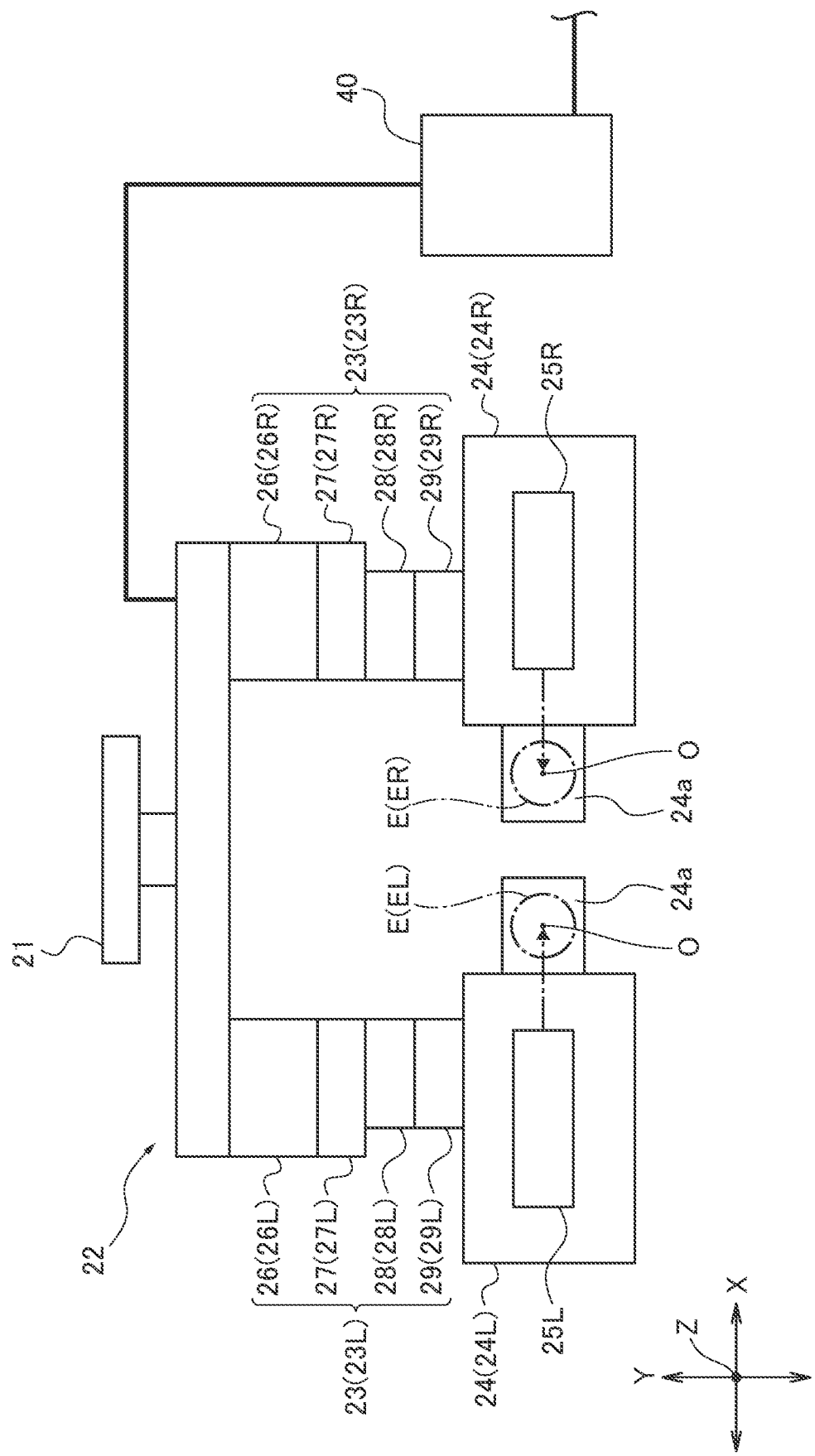
FIG. 2 illustrates a schematic configuration of a driving mechanism of a measurement head of the ophthalmologic apparatus according to the first embodiment.

The left eye driver 23L is a mechanism that is configured to individually drive the left measurement portion 24L to move horizontally (in X direction), move vertically (in Y direction), rotate about the X-direction axis, and rotate about the Y-direction axis. As illustrated in FIG. 2, the left eye driver 23L includes a left vertical driving portion 26L, a left horizontal driving portion 27L, a left Y axis rotating portion 28L, and a left X axis rotating portion 29L. The right eye driver 23R is a mechanism that is configured to individually drive the right measurement portion 24R to move horizontally (in X direction), move vertically (in Y direction), rotate about the X-direction axis, and rotate about the Y-direction axis. The right eye driver 23R includes a right vertical driving portion 26R, a right horizontal driving portion 27R, a right Y axis rotating portion 28R, and a right X axis rotating portion 29R.

The left eye driver 23L and the right eye driver 23R are symmetric with respect to a vertical plane located therebetween in the X direction. Hereinafter, the left eye driver 23L and the right eye driver 23R are referred to as "driver 23", the left measurement portion 24L and the right measurement portion 24R are referred to as "measurement portion 24", the left vertical driving portion 26L and the right vertical driving portion 26R are referred to as "vertical driving portion 26", the left horizontal driving portion 27L and the right horizontal driving portion 27R are referred to as "horizontal driving portion 27", the left Y axis rotating portion 28L and the right Y axis rotating portion 28R are referred to as "Y axis rotating portion 28", and the left X axis rotating portion 29L and the right X axis rotating portion 29R are referred to as "X axis rotating portion 29" unless they are described individually.

The vertical driving portion 26 is provided between the arm 21 and the horizontal driving portion 27 to move the horizontal driving portion 27 in the Y direction (vertical direction) relative to the arm 21. The horizontal driving portion 27 is provided between the vertical driving portion 26 and the Y axis rotating portion 28 to move the Y axis rotating portion 28 in the X direction and the Z direction (horizontal direction) relative to the vertical driving portion 26. The vertical driving portion 26 and the horizontal driving portion 27 include an actuator that generates a driving force, for example, a pulse motor, a transfer mechanism that transfers a driving force, for example, a combination of gears and rack and pinion. The horizontal driving portion 27 can be easily configured by the combination of the actuator and the transfer mechanism individually provided in the X direction and the Z direction, and can easily control the movement in the horizontal direction.

The Y axis rotating portion 28 is provided between the horizontal driving portion 27 and the X axis rotating portion 29 to rotate the X axis rotating portion 29 about an eyeball rotating Y axis extending in the Y axis through an eyeball rotating point O of the corresponding subject eye E relative to the horizontal driving portion 27. The X axis rotating portion 29 is provided between the Y axis rotating portion 28 and the corresponding measurement portion 24 to rotate the corresponding measurement portion 24 about an eyeball rotating X axis extending in the X direction through the eyeball rotating point O of the corresponding subject eye E relative to the Y axis rotating portion 28.

The Y axis rotating portion 28 and the X axis rotating portion 29 includes an actuator and a transfer mechanism similar to the vertical driving portion 26 and the horizontal driving portion 27, and the transfer mechanism that has received the driving force from the actuator moves along a circular arc guiding groove. The Y axis rotating portion 28 can rotate the measurement portion 24 about the eyeball rotating Y axis of the corresponding subject eye E when the center position of the guiding groove is aligned with the eyeball rotating Y axis. The X axis rotating portion 29 can rotate the measurement portion 24 about the eyeball rotating X axis of the corresponding subject eye E when the center position of the guiding groove is aligned with the eyeball rotating X axis. That is, the measurement portion 24 is rotatable in the right and left direction (rotation direction about Y direction) and the up and down direction (rotation direction about X direction) about the eyeball rotating point O when the center position of the guiding groove of each of the Y axis rotating portion 28 and the X axis rotating portion 29 is aligned with the eyeball rotating point O of the corresponding subject eye E.

The Y axis rotating portion 28 supports the measurement portion 24 to be rotatable about own Y axis rotation axis and rotates the measurement portion 24 through the X axis rotating portion 29 together with the horizontal driving portion 27 while changing the position that supports the measurement portion, so as to rotate the measurement portion 24 about the eyeball rotating Y axis of the corresponding subject eye E. The X axis rotating portion 29 supports the measurement portion 24 to be rotatable about the own X axis rotation axis and rotates the measurement portion 24 together with the vertical driving portion 26 while changing the position that supports the measurement portion 24, so as to rotate the measurement portion 24 about the eyeball rotating X axis of the corresponding subject eye E.

As described above, the driver 23 drives the left measurement portion 24L and the right measurement portion 24R individually or together to be moved in the X direction, Y direction, and Z direction, and rotates the left measurement portion 24L about the eyeball rotating point O of the left subject eye EL right and left or up and down to rotate the right measurement portion 24R about the center of the eyeball rotating point O of the right subject eye ER up and down or right and left. The driver 23 thereby moves the left measurement portion 24L and the right measurement portion 24R in a desired position (posture) relative to the respective corresponding subject eyes E.

The driver 23 can diverge (divergence movement) and/or converge (convergence movement) the left subject eye EL and the right subject eye ER by adjusting the positions of the left measurement portion 24L and the right measurement portion 24R. That is, the driver 23 (left-eye driver 23L and right-eye driver 23R) is a convergence adjuster that adjusts a convergence distance L1. Note that "convergence distance L1" is a distance from the left and right subject eyes EL, ER to a visual line crossing P1 in a planer view of the left and right subject eyes EL, ER. "Visual line crossing P1" is a position where a visual line direction SL (visual line) of the left subject eye EL and a visual line direction SR (visual line) of the right subject eye ER crosses. The convergence distance L1 is set by controlling a convergence angle θ1 that is an angle between the visual line direction SL of the left subject eye EL and the visual line direction SR of the right subject eye ER.

In the ophthalmologic apparatus 1 according to the first embodiment, the left measurement portion 24L and the right measurement portion 24R are provided with deflection members 24a, respectively. The left measurement optical system 25L and the right measurement optical system 25R obtain the eye characteristics of the left and right subject eyes EL, ER through the deflection member 24a. The ophthalmologic apparatus 1 simultaneously obtains the eye characteristics of both eyes with the both eyes of the examinee open by adjusting the positions of the left measurement portion 24L and the right measurement portion 24R such that each deflection member 24a is positioned to correspond to each of the left subject eye EL and the right subject eye ER. The ophthalmologic apparatus 1 also obtains the eye characteristics with the left and right subject eyes EL, ER downward or upward by changing the rotation postures of the left measurement portion 24L and the right measurement portion 24R about the eyeball rotation axis X by the X axis rotating portion 29. The ophthalmologic apparatus 1 obtains the eye characteristics with the left and right subject eyes EL, ER leftward or rightward by changing the rotation postures of the left measurement portion 24L and the right measurement portion 24R about the eyeball rotating Y axis by the Y axis rotating portion 28.

The examiner controller 30 is an information processing device that is configured to receive an input operation from the examiner and output a control signal to the controller 40. The examiner controller 30 is, for example, a tablet terminal, a smartphone, or the like. The examiner controller 30 is removable from the measurement portion 20 to be carried by the examiner. The examiner controller 30 may be a laptop or desktop personal computer or may be a dedicated controller for the ophthalmologic apparatus 1. The examiner controller 30 exchanges information with the controller 40 via wireless communication or network communication.

The examiner controller 30 includes a display 31 as illustrated in FIG. 1, an operation-side controller (not illustrated), and an input button (not illustrated). The display 31 consists of a touch panel display provided on the examiner controller 30, and the input button is set on the display. The operation-side controller consists of a microcomputer in the examiner controller 30. The operation-side controller controls an image to be displayed on the display 31 based on the measurement result or detection result transmitted from the controller 40. The operation-side controller outputs, to the controller 40, a control signal responsive to an operation to the input button.

The controller 40 is an information processing device provided below the eye examination table 12. Based on control signals transmitted from the examiner controller 30, the controller 40 controls, in a centralized manner, each part of the measurement portion 20 including the left measurement optical system 25L and the right measurement optical system 25R. The controller 40 transmits, to the examiner controller 30, the measurement results of the eye characteristics of the left and right subject eyes EL, ER measured by the left measurement portion 24L and the right measurement portion 24R.

The controller 40 carries out an after-described eyestrain estimation process. In the eyestrain estimation process, the controller 40 at first controls an optotype presentation mechanism (after-described optotype projection system 42), and separately presents an optotype at a voluntary optotype presentation distance L2 relative to the left subject eye EL and the right subject eye ER, so that the optotype is visually recognized by the left subject eye EL and the right subject eye ER. In this case, the controller 40 controls the driver 23 (left eye driver 23L and right eye driver 23R), adjusts the positions (directions) of the left measurement portion 24L and the right measurement portions 24R, sets the convergence angle θ1 to a predetermined angle, and sets the convergence distance L1 to a distance different from the optotype presentation distance L2. Next, the controller 40 controls the optotype presentation mechanism (optotype projection system 42), and gradually increases a brightness difference between the brightness of the optotype presented to the left subject eye EL (contrast of optotype to background) and the brightness of the optotype presented to the right subject eye ER (contrast of optotype to background). The controller 40 detects the visual line direction SL of the left subject eye EL and the visual line direction SR of the right subject eye ER based on the eye information (anterior-ocular-segment image E') obtained by the eye information obtaining portion (after-described observation system 41) while increasing the brightness difference of the optotype. The controller 40 further estimates the strain level (eyestrain) of the left subject eye EL and the right subject eye ER based on the visual line direction SL of the left subject eye EL and the visual line direction SR of the right subject eye ER.

Figure 3:
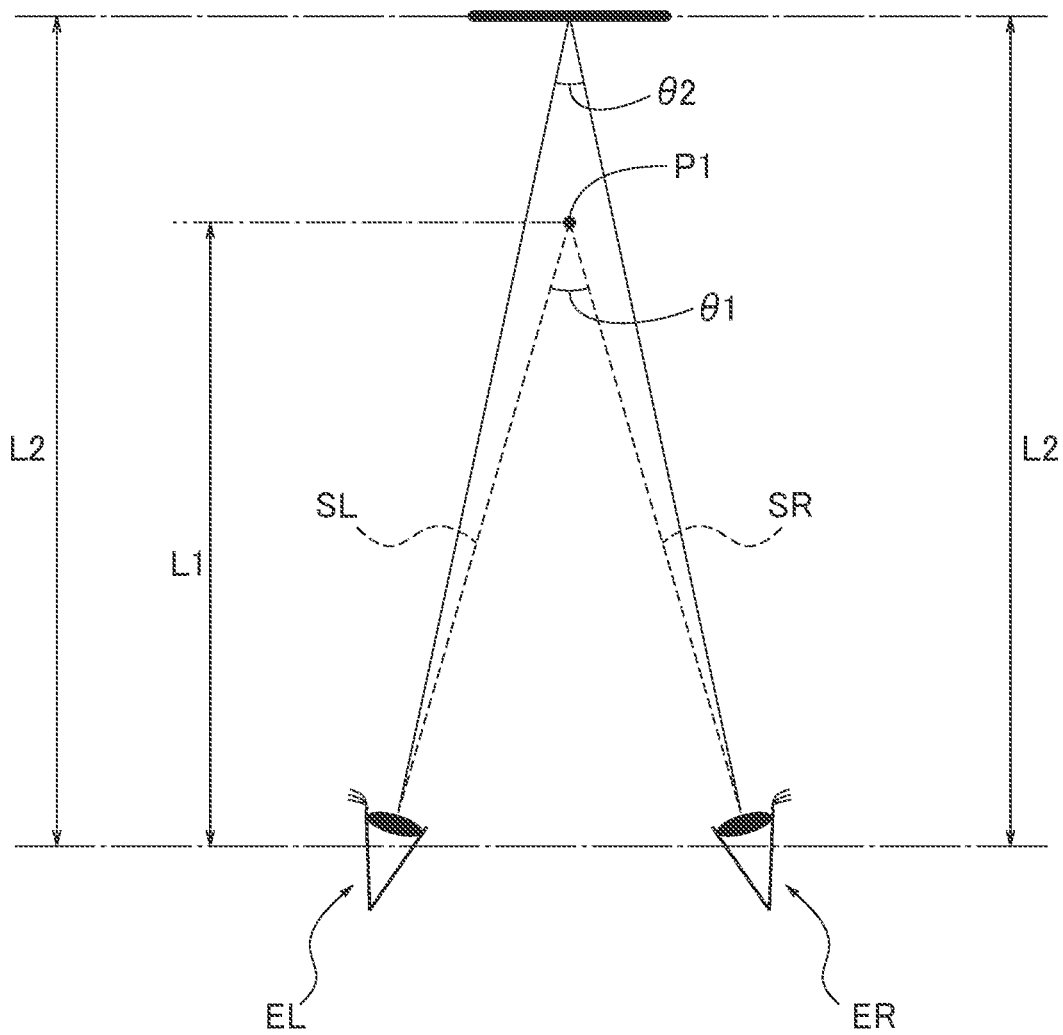
FIG. 3 illustrates a convergence distance and an optotype presentation distance.

As shown in FIG. 3, "optotype presentation distance L2" is a distance from the left subject eye EL to the optotype presented to the left subject eye EL along the Z direction and a distance from the right subject eye ER to the optotype presented to the right subject eye ER along the Z direction. In this case, the optotype presentation distance L2 of the left subject eye EL and the optotype presentation distance L2 of the right subject eye ER are the same distance. In the first embodiment, the optotype presentation distance L2 is realized by the optotype projection system 42 that is the optotype presentation mechanism. The optotype presentation distance L2 can be calculated from the power of the optotype projection system 42 (force that deflects light beam with power of lens), and can be expressed by a diopter equivalent.

That is, the controller 40 moves a movement lens 42e of the optotype projection system 42 such that the optotype is presented at a voluntary predetermined distance (optotype presentation distance L2) on the basis of the position corresponding to a far point in accordance with the refractive values (spherical equivalent) of the left and right subject eyes EL, ER to control the power of the optotype projection system 42. For example, when the optotype presentation distance L2 is set to 50 cm, the controller 40 moves the movement lens 42e to be a near sight by a power difference (2.0D) when presenting the optotype to the position (zero D) corresponding to the far point and 50 cm (2.0D) relative to the positions corresponding to the far points of the left and right subject eyes EL, ER (e.g., refractive value of left and right subject eyes EL, ER is −5.0 D) to present the optotype to the position where the refractive value is −7.0 D by changing the power of the optotype projection system 42. As a result, the controller 40 shows the optotype presented in the position of 50 cm relative to the left and right subject eyes EL, ER by the optotype projection system 42.

When the controller 40 carries out the eyestrain estimation process, the controller 40 sets the convergence distance L1 set by the convergence angle θ1 to be a distance shorter than the optotype presentation distance L2. That is, in the eyestrain estimation process, the controller 40 sets the convergence angle θ1 larger than the convergence angle θ2 when the position where the optotype is presented is viewed with both eyes, and carries out the convergence movement such that the left subject eye EL and the right subject eye ER view a distance closer than the optotype presentation distance L2 to inwardly rotate the left subject eye EL and the right subject eye ER (see FIG. 3).

While the controller 40 carries out the eyestrain estimation process, when the controller 40 detects the visual line direction SL of the left subject eye EL and the visual line direction SR of the right subject eye ER, the controller 40 detects each of the focused position (adjusted position) of the left subject eye EL and the focused position (adjusted position) of the right subject eye ER based on the eye information (ring image by fundus reflection light) obtained by the eye information obtaining portion (eye refractive power measurement system 43). Note that "focused position" is expressed by the refractive power when observing the left subject eye EL or the right subject eye ER in a predetermined position.

Next, the detailed configurations of the left measurement optical system 25L and the right measurement optical system 25R will be described with reference to FIG. 4. The left measurement optical system 25L and the right measurement optical system 25R have the same configuration. Accordingly, only the left measurement optical system 25L will be described while the description of the right measurement optical system 25R is omitted.

Figure 4:
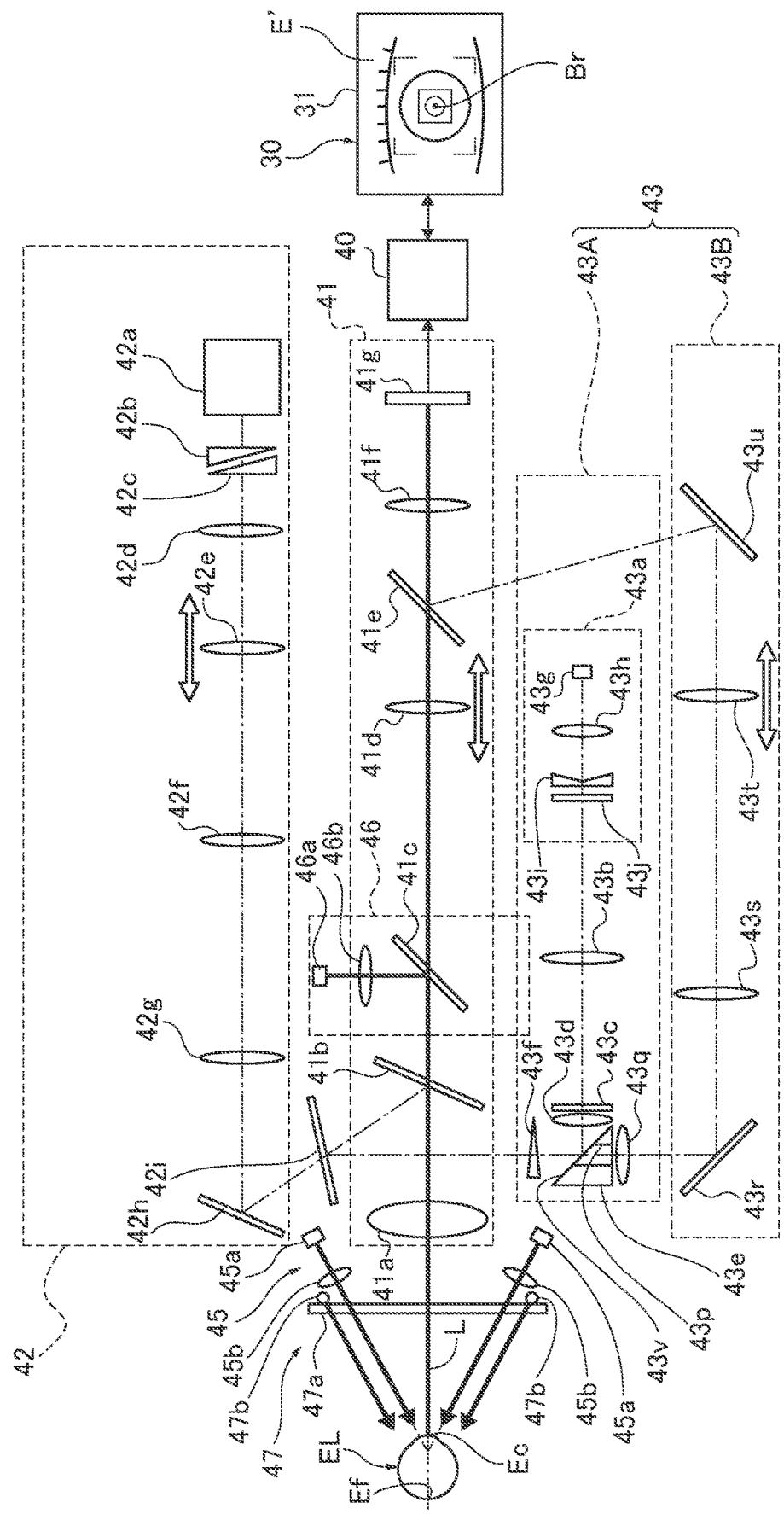
FIG. 4 illustrates a detailed configuration of a left measurement optical system of the ophthalmologic apparatus according to the first embodiment.

As illustrated in FIG. 4, the left measurement optical system 25L includes the observation system 41 (eye information obtaining portion), the optotype projection system 42 (optotype presentation mechanism), the eye refractive power measurement system 43 (eye information obtaining portion), a Z alignment system 45, an XY second alignment system 46, and a kerato-measurement system 47. The observation system 41 observes the anterior ocular segment of the left subject eye EL, and obtains the anterior-ocular-segment image E'. The optotype projection system 42 presents the optotype in a voluntary optotype presentation position to the left subject eye EL. That is, the optotype projection system 42 can set the optotype presentation distance L2 to a voluntary distance. The eye refractive power measurement system 43 measures the eye refractive power (refractive characteristics) of the left subject eye EL. The Z alignment system 45 and the XY alignment system 46 are provided to align the left measurement optical system 25L with the left subject eye EL. The Z alignment system 45 generates alignment information of the Z direction (front and back direction) along the optical axis L of the observation system 41, and the XY alignment system 46 generates the alignment information of the Y direction and X direction (up and down and left and right directions) orthogonal to the optical axis L. The kerato-measurement system 47 measures a cornea shape of the left subject eye EL.

The observation system 41 includes an objective lens 41a, a first dichroic filter 41b, a first half mirror 41c, a first relay lens 41d, a second dichroic filter 41e, a first image-forming lens 41f, and an image capturing element (e.g., CCD) 41g.

The observation system 41 forms an image of a light flux reflected by the anterior ocular segment of the left subject eye EL on the imaging element 41g by the first image-forming lens 41f via the objective lens 41a. As a result, on the imaging element 41g, a keratometry (kerato) ring light flux, a light flux of a first alignment light source 45a, and a light flux (bright spot image Br) of a second alignment light source 46a, which are described later, are projected to form the anterior-ocular-segment image E'. The imaging element 41g captures the anterior-ocular-segment image E' and acquires an image signal of the anterior-ocular-segment image E'. The controller 40 displays, on the display 31 of the examiner controller 30, the anterior-ocular-segment image E' or the like based on the image signal from the imaging element 41g. The controller 40 also detects the visual line direction SL of the left subject eye EL based on the anterior-ocular-segment image E'.

The kerato-measurement system 47 is provided ahead of the objective lens 41a. The kerato-measurement system 47 includes a kerato-plate 47a and a kerato-ring light source 47b. The kerato-plate 47a is a plate provided with a concentric slit about the optical axis of the observation system 41 and is provided near the objective lens 41a. The kerato-ring light source 47b is provided to correspond to the slit of the kerato-plate 47a.

In the kerato-measurement system 47, the light flux from the kerato-ring light source 47b in lighting passes through the slit of the kerato-plate 47a, so that a kerato-ring light flux for measurement of the cornea shape (ring-shaped optotype for measurement of cornea curvature) is projected onto the subject eye E (cornea Ec). After reflected on the cornea Ec of the subject eye E, the kerato-ring light flux forms an image on the imaging element 41g by the observation system 41. Thus, the imaging element 41g receives and/or detects the ring-shaped image of the kerato-ring light flux. The controller 40 displays, on the display 31, the image of the kerato-ring light flux detected by the imaging element 41*g*. Furthermore, the controller 40 measures the cornea shape (radius of curvature) of the left subject eye EL based on an image signal detected by the imaging element 41*g*.

The Z alignment system 45 is provided behind the kerato-measurement system 47 (kerato-plate 47*a*). The Z alignment system 45 includes a pair of first alignment light sources 45*a* and a pair of first projection lenses 45*b*.

In the Z alignment system 45, the light flux from each of the first alignment light sources 45*a* is made to the parallel light flux by the corresponding first projection lens 45*b*. Then, the parallel light flux is projected onto the cornea Ec of the left subject eye EL through an alignment hole provided at the kerato-plate 47*a*.

Based on the bright spot (bright-spot image Br) projected on the cornea Ec, the controller 40 or the examiner moves the left measurement portion 22L (or right measurement portion 22R) in the front-back direction to perform the alignment in the direction along the optical axis of the observation system 41 (Z direction, front-back direction). During the alignment in the Z direction (front-back direction), the controller 40 or the examiner adjusts the position of the left measurement portion 22L (or right measurement portion 22R) such that the ratio between the interval between two spot images by the first alignment light sources 45*a* and the diameter of the kerato-ring image on the imaging element 41*g* is in a predetermined range.

The observation system 41 is provided with the XY alignment system (parallel optical system) 46. The XY alignment system 46 includes the second alignment light source 46*a* and a second projection lens 46*b*. The XY alignment system 46 shares the first half mirror 41*c*, the first dichroic filter 41*b*, and the objective lens 41*a* with the observation system 41.

In the XY alignment system 46, the light flux from the second alignment light source (point light source) 46*a* is made to the parallel light flux through the objective lens 41*a*. Then, the parallel light flux is projected onto the cornea Ec of the subject eye E. The parallel light flux projected from the XY alignment system 46 onto the cornea Ec of the left subject eye EL forms a bright spot of the alignment light at a substantially middle position between the cornea apex and the center of curvature of the cornea Ec.

Based on the bright spot (bright-spot image Br) projected on the cornea Ec, the controller 40 or the examiner moves the left measurement portion 22L (or right measurement portion 22R) in the up-down direction or the left-right direction to perform the alignment in the directions (Y direction, up-down and X direction, left-right directions) orthogonal to the optical axis L of the observation system 41.

The optotype projection system 42 includes a display 42*a* (first display), a first rotary prism 42*b*, a second rotary prism 42*c*, a second imaging lens 42*d*, a movement lens 42*e*, a second relay lens 42*f*, a first field lens 42*g*, a first reflection mirror 42*h*, and a third dichroic filter 42*i*. The optotype projection system 42 shares the first dichroic filter 41*b* and the objective lens 41*a* with the observation system 41.

The display 42*a* displays the fixation target or the point-like optotype as the optotype for fixing a visual line for the objective examination and for fogging to the left subject eye EL and displays the subjective-examination optotype for the subjective examination of the eye characteristics of the left subject eye EL (e.g., visual acuity value, far-point power, and near-point power). The optotype to be displayed on the display 42*a* for the subjective examination is not particularly limited, provided that the optotype can be used in the eye examination. For example, the optotype includes a Landolt ring, a Snellen chart, an E chart, and the like. The optotype may be a still image or a moving image The display 42*a* may be an organic electroluminescence (EL) display or a liquid crystal display (LCD). The display 42*a* enables the display of the desired optotype in shape, mode, and contrast. That is, the display 42*a* is controlled by the controller 40 to display a voluntary optotype, and enables the change of the displayed optotype brightness (contrast of optotype to background).

The first rotary prism 42*b* and the second rotary prism 42*c* are used for adjusting a prism degree and prism base direction in a heterophoria inspection, and individually rotate by driving a pulse motor, for example. When the first rotary prism 42*b* and the second rotary prism 42*c* rotate in the revise directions to each other, the prism degree is continuously changed, and when the first rotary prism 42*b* and the second rotary prims 42*c* integrally rotate in the same direction, the prism base direction is continuously changed.

The movement lens 42*e* moves forward or backward along the optical axis of the optotype projection system 42 by a drive motor (not illustrated) controlled by the controller 40. The controller 40 moves the movement lens 42*e* toward the left subject eye EL, so that the refractive index can be displaced to the negative side. The controller 40 moves the movement lens 42*e* in the direction away from the left subject eye EL, so that the refractive index can be displaced to the positive side (far view direction). Therefore, the controller 40 changes the presentation position of the optotype displayed on the display 42*a* by the forward or backward movement of the movement lens 42*e*, so that the optotype can be presented to the left subject eye EL in any position. That is, in the ophthalmologic apparatus 1 according to the first embodiment, the optotype presentation distance L2 from the left subject eye EL to the presentation position of the optotype can be set to any distance.

The ophthalmologic apparatus 1 according to the first embodiment includes a left measurement optical system 25L that measures the eye characteristics of the left subject eye EL and a right measurement optical system 25R that measures the eye characteristics of the right subject eye ER. Accordingly, the ophthalmologic apparatus 1 includes two displays of the display 42*a* (first display) corresponding to the left subject eye EL and the display 42*a* (second display, see FIG. 3) corresponding to the right subject eye ER.

With this configuration, the ophthalmologic apparatus 1 separately presents the optotype to the left subject eye EL and the right subject eye ER, and sets the optotype presentation distance L2 to any distance. The ophthalmologic apparatus 1 differentiates the brightness of the optotype presented to the left subject eye EL and the brightness of the optotype presented to the right subject eye ER to change (increase) the brightness difference of the left and right optotypes.

In the first embodiment, the eye refractive power measurement system 43 has a function to project a predetermined measurement pattern onto the fundus Ef of the left subject eye EL and a function to detect an image of the measurement pattern projected on the fundus Ef. That is, the eye refractive power measurement system 43 includes a ring-shaped light flux projection system 43A that projects a ring-shaped measurement pattern onto the fundus Ef of the left subject eye EL and a ring-shaped light flux reception system 43B that receives and/or detects the reflected light of the ring-shaped measurement pattern from the fundus Ef. The eye refractive power measurement system 43 is not limited to the configuration of the first embodiment as long as it projects the measurement light flux onto the fundus Ef of the left subject eye EL, and obtains the measurement light flux reflected by the fundus Ef as a measurement ring image Ri. One example of another configuration of the eye refractive power measurement system 43 includes a configuration that projects point spot light as the measurement light flux onto the fundus Ef, and makes the measurement light flux reflected by the fundus Ef (reflected light flux) to be the ring-shaped light flux by passing through a ring-shaped slit or a lens to obtain the measurement ring image Ri.

The ring-shaped light flux projection system 43A includes a refraction light-source unit 43*a*, a third relay lens 43*b*, an eye-ring diaphragm 43*c*, a second field lens 43*d*, a holed prism 43*e*, and a third rotary prism 43*f*. The ring-shaped light flux projection system 43A shares the third dichroic filter 42*i* with the optotype projection system 42 and shares the first dichroic filter 41*b* and the objective lens 41*a* with the observation system 41. The refraction light-source unit 43*a* includes a refraction-measurement light source 43*g* for the refraction measurement including, for example, an LED, a collimator lens 43*h*, a conical prism 43*i*, and a ring-pattern formation plate 43*j*. The refraction light-source unit 43*a* is controlled by the controller 40 to move integrally on the optical axis of the refraction measurement system 43.

The ring-shaped light flux reception system 43B includes a hole 43*p* of the holed prism 43*e*, a third field lens 43*q*, a second reflective mirror 43*r*, a fourth relay lens 43*s*, a focusing lens 43*t*, and a third reflective mirror 43*u*. The ring-shaped light flux reception system 43B shares the objective lens 41*a*, the first dichroic filter 41*b*, the second dichroic filter 41*e*, the first image-forming lens 41*f*, and the imaging element 41*g* with the observation system 41. Furthermore, the ring-shaped light flux reception system 43B shares the third dichroic filter 42*i* with the optotype projection system 42 and shares the third rotary prism 43*f* and the holed prism 43*e* with the ring-shaped light flux projection system 43A.

When the eye refractive power measurement system 43 measures the refractive power of the left subject eye EL, the controller 40 first turns on the refraction-measurement light source 43*g*. Then, the controller 40 moves the refraction light-source unit 43*a* of the ring-shaped light flux projection system 43A and the focusing lens 43*t* of the ring-shaped light flux reception system 43B in the optical axis direction. Next, in the ring-shaped light flux projection system 43A, the refraction light-source unit 43*a* emits a ring-shaped measurement pattern. The measurement pattern travels through the third relay lens 43*b*, the eye-ring diaphragm 43*c*, and the second field lens 43*d* to the holed prism 43*e*. Then, the measurement pattern is reflected by the reflective face 43*v* of the holed prism 43*e* and guided to the third dichroic filter 42*i* through the third rotary prism 43*f*. The ring-shaped light flux projection system 43A guides the measurement pattern to the objective lens 41*a* through the third dichroic filter 42*i* and the first dichroic filter 41*b*, so that the ring-shaped measurement pattern is projected on the fundus Ef of the left subject eye EL.

The ring-shaped light flux reception system 43B condenses the ring-shaped measurement pattern formed on the fundus Ef with the objective lens 41*a* and then guides the ring-shaped measurement pattern to the hole 43*p* of the holed prism 43*e* through the first dichroic filter 41*b*, the third dichroic filter 42*i*, and the third rotary prism 43*f*. Next, the ring-shaped light flux reception system 43B guides the measurement pattern through the third field lens 43*q*, the second reflective mirror 43*r*, the fourth relay lens 43*s*, the focusing lens 43*t*, the third reflective mirror 43*u*, the second dichroic filter 41*e*, and the first image-forming lens 41*f* to form the image on the imaging element 41*g*. Thus, the imaging element 41*g* detects the image of the ring-shaped measurement pattern, and the controller 40 displays, on the display 31, the image of the measurement pattern detected by the imaging element 41*g*. Then, the controller 40 measures the spherical power, the cylindrical power, and the axial angle as refractive power based on an image signal from the imaging element 41*g*.

Note that the configurations of the eye refractive power measurement system 43, the Z alignment system 45, the XY alignment system 46, and the kerato-measurement system 47, the subjective examination, and the principles of measurement of the refractive power (refraction) of the subject eye and the cornea shape (kerato-shape) of the subject eye are known, and thus the detailed descriptions thereof are omitted.

Next, the procedures of the eyestrain estimation process by the controller 40 according to the first embodiment will be described with reference to the flowchart illustrated in FIG. 5.

In Step S1, the controller 40 measures the refractive power of the left subject eye EL and the right subject eye ER. Then, the process proceeds to Step S2. That is, the controller 40 first aligns the left measurement portion 24L with the left subject eye EL and aligns the right measurement portion 24R with the right subject eye ER. Next, the controller 40 measures the refractive power of the left and right subject eyes EL, ER. The refractive power of the left and right subject eyes EL, ER is detected based on the ring image by the ocular fundus reflection light obtained with the eye refractive power measurement system 43.

After the refractive power measurement of the both eyes in Step S1, the controller displays a voluntary optotype to the display 42*a* of the optotype projection system 42 of the left measurement optical system 25L, and displays a voluntary optotype to the display 42*a* of the optotype projection system 42 of the right measurement optical system 25R in Step S2. Then, the process proceeds to Step S3. That is, the controller 40 controls the optotype projection system 42 in Step S2 to present the optotype to the left subject eye EL and to present the optotype to the right subject eye ER. In this case, the optotype to be displayed can be voluntarily set. However, it is preferable for the optotype to be easily fixed by the examinee. Such an optotype includes an optotype having a clear center position such as Simens' star chart and asterisk. The optotype may be displayed in white with a black background or in black with a white background. The controller 40 may display the optotype in a color which can be easily fixed with a background of any color.

In this case, the controller 40 controls the optotype projection system 42 to set the optotype presentation distance L2 of the left and right to a voluntary predetermined distance (for example, 50 cm). The same optotype presentation distance L2 is set to the left and right subject eyes EL, ER. Each of the optotype projection systems 42 corresponding to each of the left and right subject eyes EL, ER thereby presents the optotype at the predetermined optotype presentation distance L2.

The controller 40 also controls the left eye driver 23L and the right eye driver 23R to adjust the positions (directions) of the left measurement portion 24L and the right measurement portion 24R by the Y axis rotating portion 28 and to adjust the positions in the horizontal direction according to the pupil distance of the left and right subject eyes EL, ER, so that the convergence angle θ1 is set to a preset predetermined distance, and the convergence distance L1 is set to a distance (e.g., 40 cm) different from the optotype presentation distance L2. That is, the rotation angle of the Y axis rotating portion 28 is determined by the convergence distance L1. As a result, the controller 40 presents the optotype at a voluntary optotype presentation distance L2 to each of the left and right subject eyes EL, ER with the convergence distance L1 set to a distance different from the optotype presentation distance L2 (in first embodiment, convergence distance L1 is shorter than optotype presentation distance L2). Note that, the convergence distance L1 and the optotype presentation distance L2 are previously determined to a predetermined distance in the first embodiment.

In the ophthalmologic apparatus 1 according to the first embodiment, the controller 40 displays the anterior-ocular-segment images E' of the left subject eye EL and the right subject eye ER obtained by the observation system 41 to the display 31 of the examiner controller 30 when the optotype is presented. In addition, the anterior-ocular-segment image E' is continuingly displayed during the eyestrain estimation process.

After the presentation of the optotype in Step S2, the controller 40 detects the visual line direction SL which is the standard of the left subject eye EL and the visual line direction SR which is the standard of the right subject eye ER in Step S3. Then, the process proceeds to Step S4. Here, "visual line direction SL, SR of standard" is meant to be a visual line direction without a brightness difference (before increasing brightness difference) of the optotype presented to each of the left and right subject eyes EL, ER. The visual line directions SL, SR are detected based on anterior-ocular-segment image E' of the left subject eye EL and the right subject eye ER obtained by the observation system 41. The observation system 41 corresponds to the eye information obtaining portion that obtains eye information for detecting the visual line direction SL of the left subject eye EL and the visual line direction SR of the right subject eye ER.

In ophthalmologic apparatus 1 according to the first embodiment, when the controller 40 detects the visual line directions SL, SR, the controller 40 displays the detection results of the visual line directions SL, SR that are the standards of the left subject eye EL and the right subject eye ER on the display 31 of the examiner controller 30 in addition to the anterior-ocular-segment images E' of the left subject eye EL and the right subject eye ER obtained by the observation system 41.

In order to detect the visual line directions SL, SR, the controller 40 first obtains the two-dimensional position of the pupil central position of the left subject eye EL and the right subject eye ER based on the magnification and the anterior-ocular-segment images E' of the left subject eye EL and the right subject eye ER. Next, the controller 40 obtains the standard position of the two-dimensional position of the bright spot (bright spot image Br) described by the XY alignment system 46 based on the magnification and the anterior-ocular-segment images E' of the left subject eye EL and the right subject eye ER. Then, the controller 40 obtains the visual line directions SL, SR based on the pupil central position and the standard position. The method of obtaining visual line directions SL, SR is not limited to the above method, and another known method may be used.

Upon detecting the visual line directions SL, SR, when the difference between the convergence distance calculated from the convergence angle obtained by the detected visual line directions SL, SR and the convergence distance L1 set by controlling the driver 23 or when the examinee appeals that the optotype appears double, it may be considered that the optotype cannot be viewed by both eyes. The examiner or the controller 40 therefore asks the examinee to direct his or her visual line in the direction of the optotype, and redetects the visual line directions SL, SR that are standards in Step S3. When the above situation is not improved even though the visual line directions SL, SR are redetected, the controller 40 once may stop the eyestrain estimation process, and may carry out the eyestrain estimation process after presenting the optotype with the optotype presentation distance L2 and the convergence distance L1 equal.

After the detection of the visual line directions SL, SR that are standards in Step S3, the controller 40 controls the left and right displays 42a to increase the difference (contrast difference) between the brightness of the optotype presented to the left subject eye EL (contrast of optotype to background) and the brightness of the optotype presented to the right subject eye ER (contrast of optotype to background) in Step S4. Then, the process proceeds to Step S5. At this time, the controller 40 continuously or gradually reduces the brightness (contrast of optotype to background) of the optotype (e.g., optotype presented to right subject eye ER) presented to a non-dominant eye with time, and fixes (maintains) the brightness (contrast of optotype to background) of the optotype (e.g., optotype presented to left subject eye EL) presented to a dominant eye. The brightness difference (contrast difference) of the optotype is thereby continuously or gradually increased with time, which makes it difficult to see the optotype by the non-dominant eye. The controller 40 controls the light source of the display 42a to change the color of the optotype to be similar to the color of the background, so that the controller 40 reduces the brightness of the optotype presented to the non-dominant eye. The reduction amount of the brightness when reducing the brightness and the method of reducing brightness can be voluntarily set. The controller 40 may divide the color tone variation of the optotype into plural steps until the color of the optotype becomes the same as the color of the background before the change in the brightness, and may reduce the color tone variation one step by one step for each Step S3 or may intermittently change the color tone of the optotype at a constant ratio until the color of the optotype becomes the same as the color of the background.

After the increase in the brightness difference of the optotype in Step S4, the controller 40 detects the visual line direction SL of the left subject eye EL and the visual line direction SR of the right subject eye ER in Step S5. Then, the process proceeds to Step S6. The method of detecting the visual line directions SL, SR is similar to Step S3.

After the detection of the visual line direction in Step S5, the focused position of the left subject eye EL (dioptometric value when observing predetermined position) of the left subject eye EL and the focused position (dioptometric value when observing predetermined position) of the right subject eye ER are detected in Step S6. Then, the process proceeds to Step S7. The focused position is detected based on the ring image by the ocular fundus reflection light obtained with the eye refractive power measurement system 43. That is, the controller 40 obtains the focused position (adjusted position) on each of the optic axes based on the refractive power of the left subject eye EL or the right subject eye ER. The eye refractive power measurement system 43 therefore corresponds to the eye information obtaining portion that obtains the eye information for detecting the focused position of the left subject eye EL and the focused position of the right subject eye ER.

After the detection of the focused position in Step S6, the change in the visual line directions SL, SR is determined in Step S7 based on the visual line direction SL of the standard left subject eye EL and the visual line direction SR of the standard right subject eye ER detected in Step S3, the visual line direction SL of the left subject eye EL and the visual line direction SR of the right subject eye ER detected in Step S5, and the focused positions of the left and right subject eyes EL, ER detected in Step S6. If the determination result is YES (visual line direction is changed), the process proceeds to Step S8. If the determination result is NO (visual line direction is not changed), the process returns to Step S4.

The change in the visual line directions SL, SR is determined, for example, based on the shift of the visual line directions SL, SR detected in Step S5 by a predetermined amount (for example, ±0.5°) relative to an average angle of the standard visual line directions SL, SR detected in Step S3. That is, the controller 40 determines "change in visual line direction" when the visual line directions SL, SR are shifted by a predetermined amount from the average angle of the standard visual line directions SL, SR. When the focused positions of the left subject eye EL and the right subject eye ER are separated by ±1.0D with a diopter conversion value, for example, from the optotype presentation distance L2, the left and right subject eyes EL, ER might not keep looking at the fixation target. In this case, the examiner or the controller 40 asks the examiner to keep looking at the fixation target, and redetects the visual line directions SL, SR in Step S5.

The controller 40 thereby repeats the processes from Step S4 to Step S7 until the controller 40 determines "change in visual line direction" in Step S7. The brightness difference between the optotype presented to the left subject eye EL and the optotype presented to the right subject eye ER thus increases with time until the visual line directions SL, SR change. In this case, the display of the anterior-ocular-segment images E' of the left and right subject eyes EL, ER, the detection of the visual line directions SL, SR, and the display of the detection results of the visual line directions SL, SR are continued. The anterior-ocular-segment images E' of the left and right subject eyes EL, ER and the detection results of the visual line directions SL, SR are displayed on the display 31 simultaneously with the increase in the brightness difference of the optotype, and the examiner can understand the conditions of the left and right subject eyes EL, ER in real time.

After the determination of the change in the visual line direction in Step S7, the controller 40 determines in Step S8 the brightness difference (brightness difference at beginning of change in visual line directions SL, SR, hereinafter referred to as "brightness difference at start of visual line change") between the optotype presented to the left subject eye EL and the optotype presented to the right subject eye ER at the time of determining the change in the visual line direction in Step S7. Then, the process proceeds to Step S9. Note that "brightness difference at start of visual line change" may be shown by brightness at the time of the beginning of the change in the visual line directions SL, SR of the optotype (optotype presented to non-dominant eye) in which the brightness is reduced.

After the determination of the brightness difference at the start of the visual line change in Step S8, the controller 40 displays (output) the information on the brightness difference at the time of the start of the visual line change determined in Step S8 on the display 31 of the examiner controller 30 in Step S9. Then, the process proceeds to Step S10.

After the display of the brightness difference information in Step S9, the controller 40 estimates in Step 10 the eyestrain of the left and right subject eyes EL, ER based on the information on the brightness difference at the time of the start of the visual line change determined in Step S8. Then, the process proceeds to END. The controller 40 also displays the estimation result of the eyestrain on the display 31 of the examiner controller 30. The controller 40 compares with the brightness of the optotype presented to the non-dominant eye at the time when the change in the typical visual line directions SL, SR takes place, and may estimate the possibility of the eyestrain when the brightness of the optotype presented to the non-dominant eye at the time of the beginning of the change in the visual line directions SL, SR is smaller than that. The controller 40 may estimate the present eyestrain based on the comparison result with the brightness difference at the time when the change in the visual line directions SL, SR of the past left and right subject eyes EL, ER took place.

Hereinafter, the effects of the ophthalmologic apparatus 1 according to the first embodiment will be described.

Figure 5:
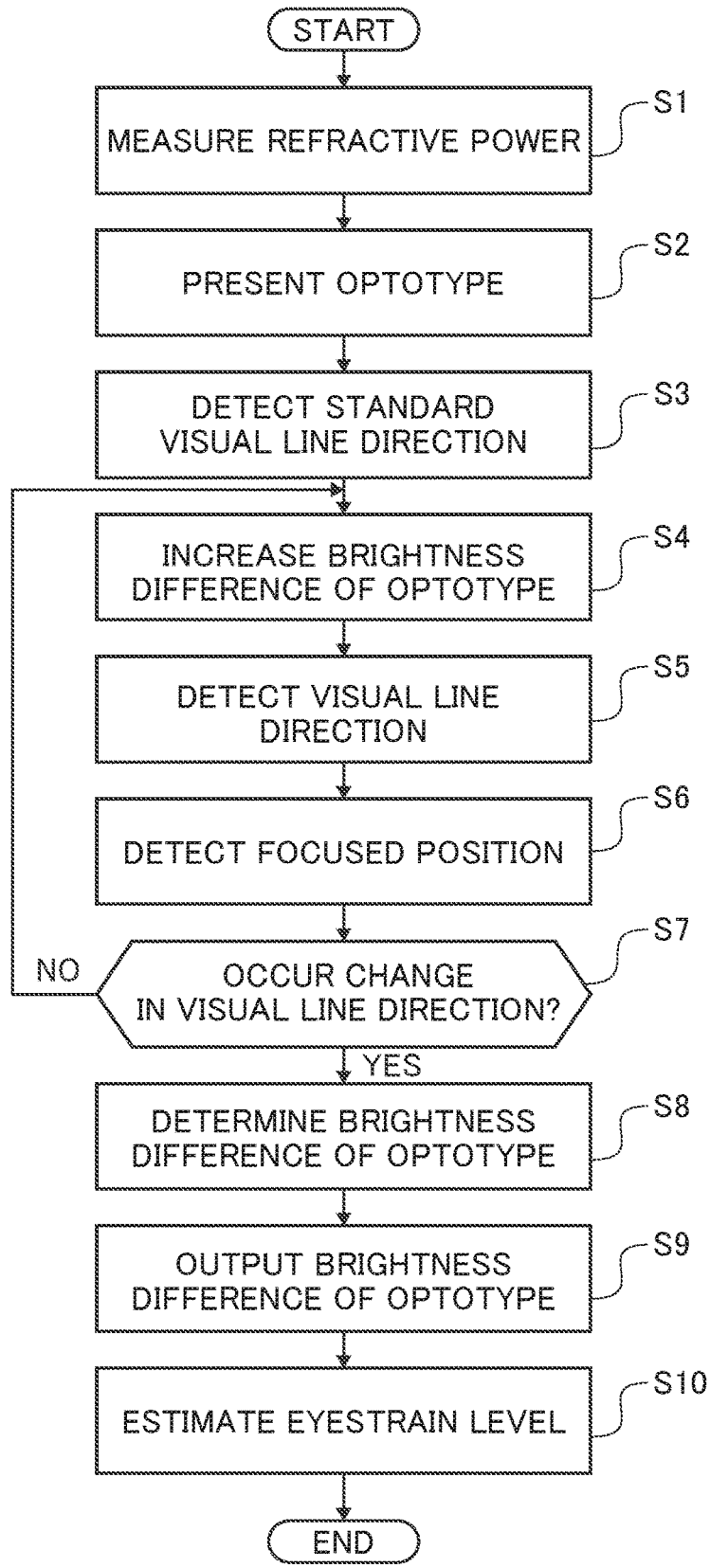
FIG. 5 is a flowchart of an eyestrain estimation process to be performed by a controller according to the first embodiment.

When the ophthalmologic apparatus 1 according to the first embodiment estimates the eyestrain of the left subject eye EL or the right subject eye ER, the ophthalmologic apparatus 1 carries out the eyestrain estimation process illustrated in FIG. 5. That is, the controller 40 measures the refractive power of the left subject eye EL and the right subject eye ER (Step S1), and then presents the optotype to each of the left and right subject eyes EL, ER at a voluntary optotype presentation distance L2 (Step S2). In this case, the controller 40 controls the driver 23 (left eye driver 23L and right eye driver 23R) to adjust the positions (directions) of the left measurement portion 24L and the right measurement portion 24R, and to adjust the convergence angle θ1 to be a predetermined angle by adjusting the position in the horizontal direction in accordance with the pupil distance of the left and right subject eyes EL, ER. Thus, the controller 40 sets the convergence distance L1 to a distance different from the optotype resonation distance L2.

In particular, in the first embodiment, the controller 40 sets the convergence distance L1 to 40 cm, and sets the optotype presentation distance L2 to 50 cm. That is, the controller 40 sets the convergence distance L1 shorter than the optotype presentation distance L2. The left subject eye EL and the right subject eye ER are thereby converged (convergence movement) such that the visual line is directed to the position different from the position where the optotype is presented, to the position at a distance closer than the position where the optotype is presented in the first embodiment.

Next, the controller 40 detects the visual line direction SL which is the standard of the left subject eye EL and the visual line direction SR which is the standard of the right subject eye ER (Step S3) based on the anterior-ocular-segment image E' obtained with the observation system 41.

The controller 40 then increases the brightness difference of the left and right optotypes by the optotype presentation distance L2. More specifically, the controller 40 continuously or gradually reduces the brightness of one of the optotypes presented to the left subject eye EL and the optotype presented to the right subject eye ER (e.g., optotype presented to right subject eye ER when non-dominant eye is right eye) with time, and fixes the brightness of the other (e.g., optotype presented to left subject eye EL when dominant eye is left eye) (Step S4). The brightness difference of the left and right optotypes is thereby increased with time, and the optotype in which the brightness reduces (e.g., optotype presented to right subject eye ER) continuously or gradually darkens with time.

Next, the controller 40 redetects the visual line direction SL of the left subject eye EL and the visual line direction SR of the right subject eye ER based on the anterior-ocular-segment image E' (Step S5). The controller 40 then detects the focused positions of the left subject eye EL and the right subject eye ER based on the ring image obtained with the eye refractive power measurement system 43 at the same time as the detection of the visual line directions SL, SR (Step S6). After that, the controller 40 determines the change in the visual line directions SL, SR based on the focused positions and the visual line directions SL, SR of the left and right subject eyes EL, ER detected before the increase in the brightness differences of the optotype (Step S7).

When the brightness (contrast of optotype to background) of the optotype presented to the left subject eye EL is almost the same as the brightness (contrast of optotype of background) of the optotype presented to the right subject eye ER, and the brightness difference (contrast difference) of the optotypes of the left and right subject eyes EL, ER is almost zero (including zero), the fusion in which the image of the optotype viewed by each of the left and right subject eyes EL, ER is recognized as one image by the examinee is established, and the visual line directions SL, SR are not changed.

When the brightness of the optotype (e.g., optotype presented to right subject eye ER) presented to the non-dominant eye (e.g., right subject eye ER) is reduced with time (contrast of optotype to background is reduced), and the brightness difference in the left and right optotypes increases, the non-dominant eye becomes gradually difficult to see the optotype. In this case, when the brightness difference in the left and right optotypes falls in a certain range, the examinee recognizes the image of the optotype viewed by each of the left and right subject eyes EL, ER as one image, so that the convergence condition of the left and right subject eyes EL, ER is maintained, and the fusion is established.

When the brightness difference in the left and right optotypes increases to exceed a certain range, the examinee cannot visually recognize the optotype by the non-dominant eye, so that the convergence cannot be maintained. As a result, the fusion is destroyed, and the eye positions of the left and right subject eyes EL, ER become the eye positions from which the fusion is removed, resulting in the change in the visual line directions SL, SR. In addition, "eye position" is meant to be a direction in which each of the left and right subject eyes is directed, and corresponds with the visual line directions SL, SR in this case.

In contrast, in the ophthalmologic apparatus 1 according to the first embodiment, when the optotype is firstly presented, the convergence distance L1 is set to the distance different from the optotype presentation distance L2 (convergence distance L1 is distance shorter than optotype presentation distance L2). The left and right subject eyes EL, ER are thereby converged (convergence movement) such that the visual line is directed to the position at a distance closer than the position where the optotype is presented, and is rotated inward of the eye position where the convergence distance L1 corresponds with the optotype presentation distance L2 (eye position when viewing actual optotype presented at optotype presentation distance L2, convergence angle θ2).

For example, if the non-dominant eye (subject eye in which optotype brightness is reduced) has exophoria or orthophoria, when the fusion is removed, the non-dominant eye rotates outwardly from the converged state, and is directed outwardly on a scale larger than that when the optotype presentation distance L2 is visually recognized with both eyes.

When the subject eye corresponding to the optotype in which the brightness is reduced has esophoria, the subject eye rotates inwardly than the orthophoria in the eye position in which the fusion is removed. For this reason, the eye position is hardly changed on a large scale even though the fusion is removed. In this case, the controller 40 represents the optotype by setting the convergence distance L1 to a distance longer than the optotype presentation distance L2 at the time of recognizing the esophoria of the subject eye, and remeasures the change in the visual line directions SL, SR while increasing the brightness difference of the optotype. Alternatively, when the subject is recognized as the esophoria in advance, the controller 40 presents the optotype by setting the convergence distance L1 to a distance longer than the optotype presentation distance L2, and measures the change in the visual line directions SL, SR while increasing the brightness difference of the optotype. The visual line directions SL, SR are thereby the near visual side when the fusion is removed. That is, the left and right subject eyes EL, ER rotate inwardly from the diverged state, and are directed inwardly than that when the optotype presentation distance L2 is viewed.

As described above, the ophthalmologic apparatus 1 according to the first embodiment can shift the eye positions of the left and right subject eyes EL, ER when the eye positions become the eye position in which the fusion is removed by increasing the brightness difference of the optotypes presented to the left and right subject eyes EL, ER from the binocular vison state even though the examinee has no heterophoria, i.e., regardless of the heterophoria of the examinee.

In the ophthalmologic apparatus 1 of the first embodiment, when the optotype is presented by the optotype presentation mechanism, the controller 40 sets the convergence distance L1 to a distance shorter than the optotype presentation distance L2. The left and right subject eyes EL, ER are therefore converged (convergence movement) such that the visual lines are directed to a position at a distance closer than the position where the optotype is presented, and rotate inwardly than the eye position when the actual optotype actually presented at the optotype presentation distance L2 is viewed.

It is typically considered there are more people having exophoria than people having normal eye positions (orthophoria). For this reason, by the convergence movement of the left and right subject eyes EL, ER such that the visual lines are directed to the position at a distance closer than the position where the optotype is presented, it is assumed that the visual line directions SL, SR can be often largely changed when the eye position becomes the eye position in which the fusion is removed. The eyestrain can be thereby easily estimated.

The convergence distance L1 is set to a distance different from the optotype presentation distance L2. The controller 40 therefore may set the convergence distance L1 to 40 cm, for example, may set the optotype presentation distance L2 to 30 cm to the subject eye in which esophoria is previously found, and nay sets the convergence distance L1 to a distance longer than the optotype presentation distance L2. In this case, the left and right subject eyes EL, ER are diverged (divergence movement) such that the visual lines are directed to the position at a distance farther than the position where the optotype is presented, and rotates outwardly than the eye position when viewed by actually presenting the optotype at the optotype presentation distance L2.

Even in this case, the visual line directions SL, SR are easily changed when the left and right subject eyes EL, ER become the eye position in which the fusion is removed, and the eye position can be easily shifted.

The controller 40 determines the brightness difference (brightness difference at start of visual line change) of the left and right optotypes at the time of determining the change in the visual line direction when the controller 40 determines the change in the visual line directions SL, SR, i.e., the eye position is shifted (Step S8). The controller 40 also displays the information on the brightness difference at the start of the visual line change on the display 31 (Step S9), and estimates the eyestrain of the left and right subject eyes EL, ER based on the information on the brightness difference at the start of the visual line change (Step S10). The controller 40 also displays the estimation result of the eyestrain on the display 31.

That is, in the ophthalmologic apparatus 1 according to the first embodiment, the controller 40 estimates the strain level of the left and right subject eyes EL, ER based on the visual line direction SL of the left subject eye EL and the visual line direction SR of the right subject eye ER, so that the eyestrain can be appropriately estimated.

In the ophthalmologic apparatus 1 according to the first embodiment, the controller 40 displays the estimation result of the eyestrain on the display 31, so that the strain level of the left and right subject eyes EL, ER can be easily understood when the examiner visually recognizes the display 31.

The ophthalmologic apparatus 1 according to the first embodiment includes the two optotype projection systems 42 corresponding to the left and right subject eyes EL, ER, respectively. One optotype presentation system 42 includes the display 42a that presents the optotype to the left subject eye EL and enables the change in the brightness of the optotype. The other optotype projection system 42 can preciously change the brightness of the optotype presented to the left subject eye EL and the brightness of the optotype presented to the right subject eye ER. The controller 40 can appropriately increase the brightness difference of the left and right optotypes.

In the ophthalmologic apparatus 1 according to the first embodiment, the controller 40 detects the focused position of the left subject eye EL and the focused position of the right subject eye ER when detecting the visual line directions SL, SR of the left and right subject eyes EL, ER. In this case, the controller 40 can determine the position (distance) viewed by the left subject eye EL and the right subject eye ER based on the detection result of the focused position. The controller 40 therefore can determine that the optotype is accurately viewed based on the determination result of the focused position when determining the change in the visual line directions by detecting the focused positions of the left and right subject eyes EL, ER, so that the determination accuracy of the change in the visual line directions SL, SR can be improved.

In the ophthalmologic apparatus 1 of the first embodiment, the controller 40 displays the anterior-ocular-segment images E' of the left subject eye EL and the right subject eye ER that are the eye information obtained with the observation system 41 on the display 31 at the same time as the increase in the brightness difference (contrast difference) in the left and right optotypes when gradually increasing the brightness difference of the optotype. In this case, the anterior-ocular-segment images E' of the left and right subject eyes EL, ER are the eye information for use in the detection of the visual line directions SL, SR. The examiner therefore can monitor the movement of the left and right subject eyes EL, EL while the brightness difference of the optotype increases by visually recognizing the display 31, so that the examiner can determine the change in the visual line directions SL, SR.

As described above, the ophthalmologic apparatus according to the present disclosure is described based on the first embodiment; however, the specific configuration is not limited to the first embodiment, and the change in the design and the addition are allowed as long as they do not depart from the invention according to each claim.

That is, in the ophthalmologic apparatus 1 according to the first embodiment, the convergence distance L1 and the optotype presentation distance L2 are previously determined. However, the controller 40 first detects each of the eye position of the left subject eye EL and the eye position of the right subject eye ER when carrying out the eyestrain estimation process. Then, the controller 40 may set the convergence distance L1 and the optotype presentation distance L2 based on the eye position of the left subject eye EL and the eye position of the right subject eye ER. That is, the controller 40 may change the convergence distance L1 and the optotype presentation distance L2 according to the eye positions of the left and right subject eyes EL, ER.

The eye position detected at this time may be the eye position when removing fusion (eye position when fusion is removed with both eyes being fixed) or the eye position when the optotype is visually recognized with the convergence distance L1 corresponding to the optotype presentation distance L2, for example. It is not necessary for the subject eye to look at the optotype, so that the eye position when removing fusion has a relaxed posture without convergence. The eye position can be detected by a cover test or an undercover test, for example. The cover test is an examination that evaluates the change in the eye position of the other subject eye when covering one subject eye with the optotype being viewed with the both eyes of the examinee. The undercover test is an examination that evaluates the change in the eye position of the shield subject eye when the covering is removed from the state in which one eye is covered.

The controller 40 can set the convergence distance L1 and the optotype presentation distance L2 to appropriate distances, respectively, based on the eye positions of the left and right subject eyes EL, ER. The ophthalmologic apparatus 1 according to the first embodiment can sufficiently shift the eye position when the eye position becomes the eye position where the fusion is removed, and can improve the estimation accuracy of the eyestrain.

In the first embodiment, the ophthalmologic apparatus 1 includes the two optotype presentation systems 42 corresponding to the left and right subject eyes EL, ER, respectively, as the optotype presentation mechanisms, and includes the display 42a that can display any optotype with each optotype projection system 42, and can change the brightness. However, the configuration of the optotype presentation mechanism is not limited thereto. For example, the optotype presentation mechanism includes a liquid crystal shutter disposed between the optotype and the left and right subject eyes EL, ER, and increases the brightness difference of the optotypes presented to the left and right subject eyes EL, ER by changing the transmission of the liquid crystal shutter. That is, the optotype presentation mechanism can change the brightness difference of the left and right optotypes by changing not only the brightness of the optotype itself (contrast of optotype to background) but also the light volume of the light entering each of the left and right subject eyes EL, ER.

The optotype projection system 42 includes a mechanism that can present the optotype to the left and right subject eyes EL, ER at a voluntary optotype presentation distance L2, and change the brightness (contrast) of one eye. In this case, it is not necessary to independently provide the optotype projection system 42 for left and right, respectively.

In the ophthalmologic apparatus 1 according to the first embodiment, when determining the change in the visual line directions SL, SR, the focused positions of the left and right subject eyes EL, ER are detected. However, the focused position is not always required to be detected because the focused position is detected for securing the determination system when determining the change in the visual line directions SL, SR.

In the ophthalmologic apparatus 1 according to the first embodiment, the estimation result of the eyestrain levels of the left and right subject eyes EL, ER and the anterior-ocular-segment images E' of the left and right subject eyes EL, ER when gradually increasing the brightness difference of the optotype are displayed on the display 31 of the examiner controller 30. However, the display 31 may be a monitor installed on the eye examination table 12 or a display provided in the measurement portion 20 as the display as long as it can be viewed at least by an examiner.

In the first embodiment, the brightness of the optotype presented to the non-dominant eye (contrast of optotype to background) is reduced, and the brightness of the optotype presented to the dominant eye (contrast of optotype to background) is fixed. However, when increasing the brightness difference of the left and right optotypes, the controller 40 may reduce the brightness of the optotype presented to the dominant eye, and fixes the brightness of the optotype presented to the non-dominant eye to increase the brightness difference of the left and right optotypes.

In the ophthalmologic apparatus 1 according to the first embodiment, it is determined that the visual line directions SL, SR are changed when the visual line directions SL, SR after increasing the brightness difference are shifted by a predetermined amount (for example, ±0.5°), and the brightness difference at that time is set as "brightness difference at start of visual line change". That is, in the first embodiment, the timing in which the visual line directions SL, SR are shifted by a predetermined amount to the standard visual line directions SL, SR as "timing in which visual line directions SL, SR are changed".

However, the method of determining the timing in which the visual line directions are changed (at time of start of visual line change) and the method of determining the brightness difference at the time of start of the visual line change are not limited thereto. For example, the controller 40 may set the timing in which a first straight line collinear approximated to a value showing the visual line directions SL, SR when changed even a little and a second line (inclination is zero) collinear approximated to a value showing the visual line directions SL, SR that are standard (before increasing brightness difference of optotype) cross relative to the standard visual line directions SL, SR, and may set the brightness difference of the left and right optotypes at that time to "brightness difference at start of visual line change". In this case, the controller 40 can determine that the visual line directions SL, SR are changed before the visual line directions SL, SR are shifted by a predetermined amount to the standard.

In the ophthalmologic apparatus 1 according to the first embodiment, the increase in the brightness difference of the optotype at the time of the start of the change in the visual line directions SL, SR is stopped, and "brightness difference at start of visual line change" is determined. However, the controller 40 may keep detecting the change in the visual line directions SL, SR until the brightness of one optotype becomes zero, that is, one optotype becomes the same color as the background. In this case, the method of determining "at time of start of visual line change" and "brightness difference at time of start of visual line change" may be the above method or another method. That is, the controller 40 first graphs the amount of the visual line change (variation amount of eye position) until the visual line directions SL, SR become the visual line directions SL, SR when the brightness of the optotype is zero from the standard visual line directions SL, SR (before change in brightness). The controller 40 then may set the timing in which a straight line connecting the amount of the visual line change at the time that the visual line change ratio is 0.9 (90%) (i.e., at time that visual line is changed by 10%) and the amount of the visual line change amount at the time that the visual line change ratio is 0.9 (90%) (i.e., at time that visual line is changed by 90%) and a straight line (inclination is zero) showing the amount of the standard visual line change (before changing brightness) cross to "at time of start of visual line change", and may set the brightness difference of the right and left optotypes at that time to "brightness difference at time of start of visual line change".

In the ophthalmologic apparatus 1 according to the first embodiment, the anterior-ocular-segment images E' of the left and right subject eyes EL, ER and the detection results of the visual lines SL, SR are intermittently displayed while the brightness difference of the optotype is increased. However, the anterior-ocular-segment image E' and the detection result of the visual line directions SL, SR may be displayed in a timing in which the visual line directions SL, SR are changed or the timing in which the brightness of one optotype becomes zero, i.e., the timing in which one optotype becomes the same color as the background.

What is claimed is:

1. An ophthalmologic apparatus comprising:
    an optotype presentation mechanism, in which a distance from each of a left subject eye and a right subject eye to an optotype is an optotype presentation distance, a position where a visual line of the left subject eye and a visual line of the right subject eye cross is a visual line crossing, and a distance from each of the left subject eye and the right subject eye to the visual line crossing is a convergence distance, and the optotype presentation mechanism is configured to present the optotype to the left subject eye and to the right subject eye, and the optotype presentation mechanism is further configured to change a brightness difference between the optotype presented to the left subject eye and the optotype presented to the right subject eye;
    a convergence adjustment mechanism configured to make an optical adjustment to the visual line of the left subject eye and the visual line of the right subject eye to adjust the convergence distance to be different than the optotype presentation distance;
    an eye information obtaining portion configured to obtain eye information on the left subject eye and the right subject eye; and
    a controller configured to control the optotype presentation mechanism, the convergence adjustment mechanism, and the eye information obtaining portion,
    wherein the controller sets the convergence distance to a distance different from the optotype presentation distance by controlling the convergence adjustment mechanism, gradually increases the brightness difference while presenting the optotype at the optotype presentation distance presented by the optotype presentation mechanism, and detects a visual line direction of the left subject eye and a visual line direction of the right subject eye based on the eye information obtained by the eye information obtaining portion.

2. The ophthalmologic apparatus according to claim 1, wherein the controller estimates an eyestrain level of the left subject eye or the right subject eye based on a change in one of the visual line direction of the left subject eye or the visual line direction of the right subject eye caused by the brightness difference resulting in non-fusion of the visual line of the left subject eye and the visual line of the right subject eye at the visual line crossing at the convergence distance.

3. The ophthalmologic apparatus according to claim 2, comprising a display capable of being recognized at least by an examiner,
wherein the controller displays an estimation result of the eyestrain level on the display.

4. The ophthalmologic apparatus according to claim 1, wherein the controller sets the convergence distance to a distance shorter than the optotype presentation distance.

5. The ophthalmologic apparatus according to claim 1, wherein the optotype presentation mechanism includes a first display capable of arbitrary changing brightness of the optotype while presenting the optotype to the left subject eye and a second display capable of arbitrary changing brightness of the optotype while presenting the optotype to the right subject eye.

6. The ophthalmologic apparatus according to claim 1, wherein the controller detects a focus position of the left subject eye and a focus position of the right subject eye based on the eye information obtained by the eye information obtaining portion when detecting the visual line direction.

7. The ophthalmologic apparatus according to claim 1, comprising a display capable of being visually recognized at least by an examiner,
wherein the controller displays the eye information obtained by the eye information obtaining portion on the display when gradually increasing the brightness difference by the optotype presentation mechanism.

8. The ophthalmologic apparatus according to claim 1, wherein the controller detects an eye position of the left subject eye and an eye position of the right subject eye based on the eye information obtained by the eye information obtaining portion, and sets the optotype presentation distance and the convergence distance based on the eye position of the left subject eye and the eye position of the right subject eye.

* * * * *